United States Patent [19]

Barnes

[11] Patent Number: 4,895,106

[45] Date of Patent: Jan. 23, 1990

[54] SEED TREATER AND CONVEYING APPARATUS

[76] Inventor: Ronald A. Barnes, 915 S. 218th Street, Elkhorn, Nebr. 68022

[21] Appl. No.: 293,193

[22] Filed: Jan. 3, 1989

[51] Int. Cl.$^4$ ................................................ B05C 3/08
[52] U.S. Cl. ...................................... 118/684; 118/19; 118/303; 118/417
[58] Field of Search ................. 118/684, 303, 417, 19; 427/212, 242, 213.3; 222/545, 504, 561, 412, 413, 533, 342; 47/1.7, 57.6, DIG. 9; 198/312, 317, 318; 414/503–505, 523, 526

[56] References Cited

U.S. PATENT DOCUMENTS

| | | | |
|---|---|---|---|
| 2,557,479 | 6/1951 | Smith | 118/684 X |
| 3,650,241 | 3/1972 | North | 118/684 |
| 3,773,220 | 11/1973 | Morgan et al. | 222/504 X |
| 3,866,799 | 2/1975 | Rikker et al. | 222/504 X |
| 4,023,525 | 5/1977 | Weber | 118/303 |
| 4,220,115 | 9/1980 | Brossman et al. | 118/684 |
| 4,357,900 | 11/1982 | Buschor | 118/684 X |
| 4,465,017 | 8/1984 | Simmons | 118/684 X |
| 4,503,803 | 3/1985 | Barnes | 118/303 |
| 4,576,108 | 3/1986 | Socola et al. | 118/19 |

Primary Examiner—Richard L. Chiesa
Attorney, Agent, or Firm—Zarley, McKee, Thomte, Voorhees & Sease

[57] ABSTRACT

A seed treating and conveying apparatus includes an elongated auger unit on which a liquid chemical applicator tank is mounted for treating the seeds as they are conveyed through the auger tube. The auger includes a central shaft having brush flighting thereon for gentle handling of the seeds as well as for picking up treatment and thoroughly and uniformly applying it to the seeds. The auger unit is pivotally supported for adjusting the position of the discharge end without moving the vehicle on which it is mounted.

2 Claims, 8 Drawing Sheets

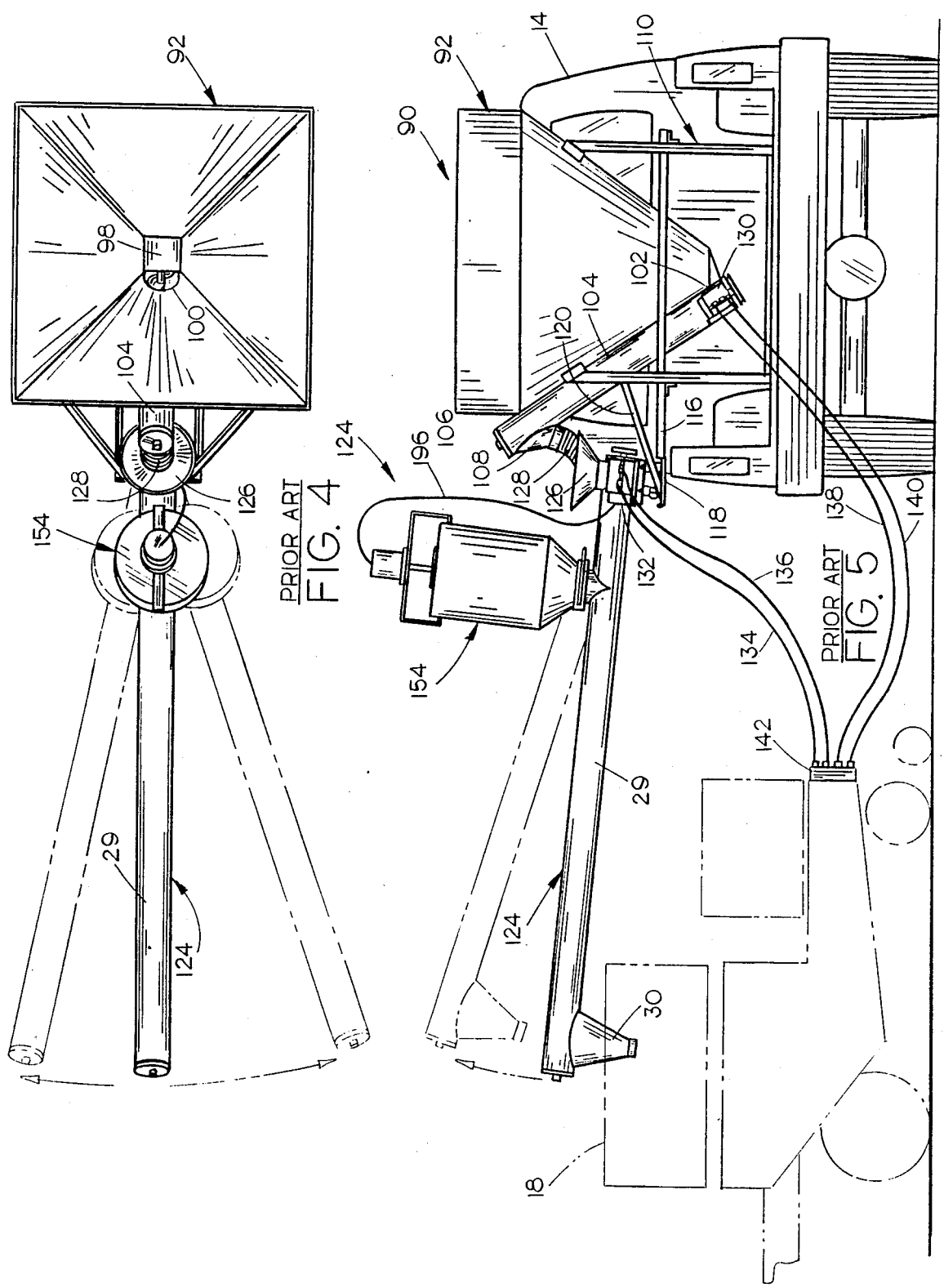

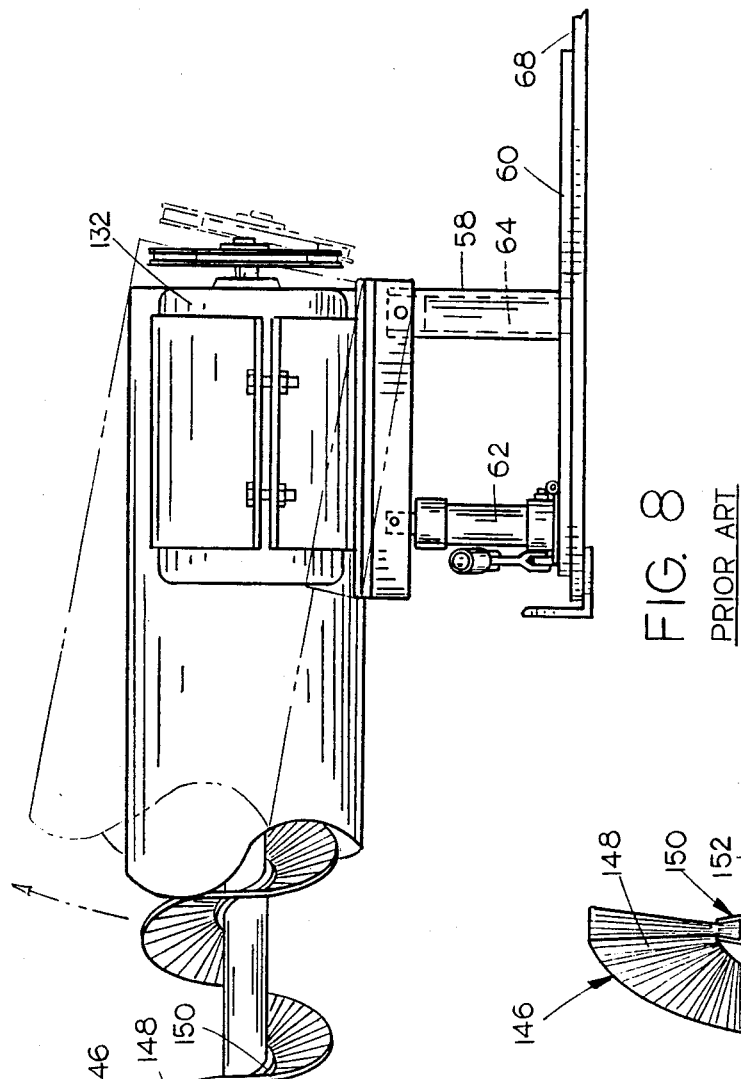
FIG. 8 PRIOR ART
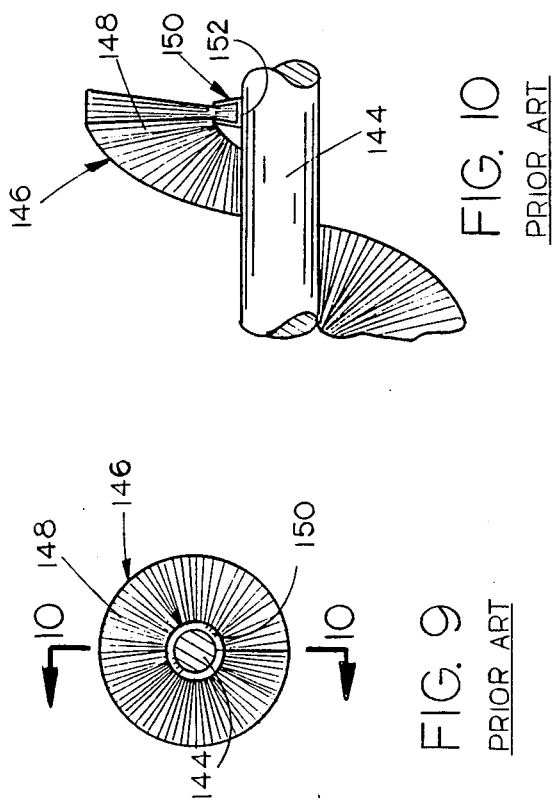
FIG. 10 PRIOR ART
FIG. 9 PRIOR ART

SEED TREATER AND CONVEYING APPARATUS

BACKGROUND OF THE INVENTION

The present invention is directed generally to an apparatus for chemically treating and conveying seeds and more particularly to a truck mounted apparatus for readily transferring seed from the truck to the hoppers of a planter implement and simultaneously applying a chemical treatment to the seeds as they are conveyed from the truck to the planter implement.

Large modern planters are designed to accurately and efficiently deposit seeds in multiple rows in a single pass across a field. The process for delivering seed corn to the planter implement and for loading seed corn into the implement hoppers, however, has remained substantially unchanged. Usually this is done by manually carrying bags of seed from a truck or the like and emptying each into a respective hopper of the planter implement. The lifting of the bags is strenuous labor and the many steps back and forth between the truck and planter take substantial valuable planting time.

Machines for conveying seed and the like usually include an auger with standard steel flighting. The constant hitting and bouncing of the seed as it travels through such an auger results in significant damage to the seed including breakage of both the treatment coating and/or the seeds themselves. Furthermore, considerable time is consumed in readjusting the auger equipped vehicles' position for discharging seed into the spaced-apart hoppers of the planter implement.

The application of chemical treatments to seed has conventionally been done after the seed is added to the planter hoppers by pouring powdered treatment onto the seed and then manually stirring it in with an axe handle or the like. Such application is non-uniform and incomplete, as expected.

In applicant's earlier U.S. Pat. No. 4,503,803, an apparatus was described which represented a significant advance in the art. In this application, a means is specifically described for treating the seed with a liquid chemical and is believed to represent an advance over applicant's earlier patent.

It is therefore a primary object of this invention to provide an improved seed treating and conveying apparatus including means for treating the seed with a liquid chemical.

SUMMARY OF THE INVENTION

The seed treating and conveying apparatus of the present invention, in one form thereof, includes an elongated auger unit having a relatively small seed hopper on the inlet end thereof, which inlet end is mounted for both pivotal movement about a generally upright pivot axis and longitudinal sliding movement along an elongated slide track. The slide track is supported in spaced relation above the truck bed on which it is mounted so as to leave substantially the entire truck bed open for carrying bags of seed. The combined pivotal and slide support for the inlet end of the auger unit enables the unit to be readily repositioned for filling many spaced-apart hoppers without changing the position of the truck. Furthermore, the position of the discharge auger is readily adjusted by the individual pouring seeds into the hopper, thereby affording a convenient one-man operation.

Seed conveyed through the auger unit is gently handled by a brush auger having a central shaft and a plurality of bristles extended outwardly therefrom in a generally spiral path. The bristles are stiff enough to provide adequate flow capacity while being sufficiently resilient to prevent crushing of the seeds.

The seeds may be simultaneously chemically treated while they are being conveyed. To accomplish this, an applicator tank is mounted on the auger tube in communication with the auger therein for depositing treatment onto the seed being conveyed by the auger. The chemical treatment is not only applied directly to the seeds but is also picked up by the bristles of the brush auger for being thoroughly applied to all seeds within the auger tube. The treatment tank is preferably equipped with an agitator, an adjustable closure valve and a baffle within the discharge opening of the tank to prevent seeds from being thrown up into the tank.

Another form of the invention includes a large seed hopper supported on a frame so that the two may be loaded as a unit onto a truck, wagon or such other conveyance that the farmer may use. The frame includes an outward extension for supporting the inlet end of an outer auger unit for pivotal movement about an upright pivot axis. Seed from the hopper is conveyed to the outer auger unit by a short stationary inner auger unit. Both augers are preferably hydraulically driven by lines adapted for connection to the hydraulic system of the tractor or planter implement being serviced. The outer auger is removable for use in loading seed into the hopper.

The present form of the invention includes a liquid chemical container having a valve means associated therewith which is coordinated with the actuation of the auger so that the proper amount of liquid chemical is supplied to the interior of the auger.

BRIEF DESCRIPTION OF THE DRAWINGS

FIG. 4 is a top plan view of the large stationary hopper unit of the previous invention with dotted lines indicating the pivoted positions of the outer auger unit;

FIG. 5 is a rear elevational view of the large stationary hopper unit of the prior invention installed on a pickup truck;

FIG. 8 is an enlarged partial side elevational view of the discharge auger unit of the previous invention with a portion broken away to show the brush auger therein:

FIG. 9 is a detail end sectional view of the prior invention taken along line 9—9 of FIG. 8;

FIG. 10 is a partial sectional side elevational view of a portion of the brush auger of the previous invention;

DESCRIPTION OF THE PREFERRED EMBODIMENT

The seed treater and conveying apparatus of applicant's U.S. Pat. No. 4,503,803 is illustrated in FIGS. 1–12 and will be described herein to provide the necessary description and environment for the present invention.

Figure 1:
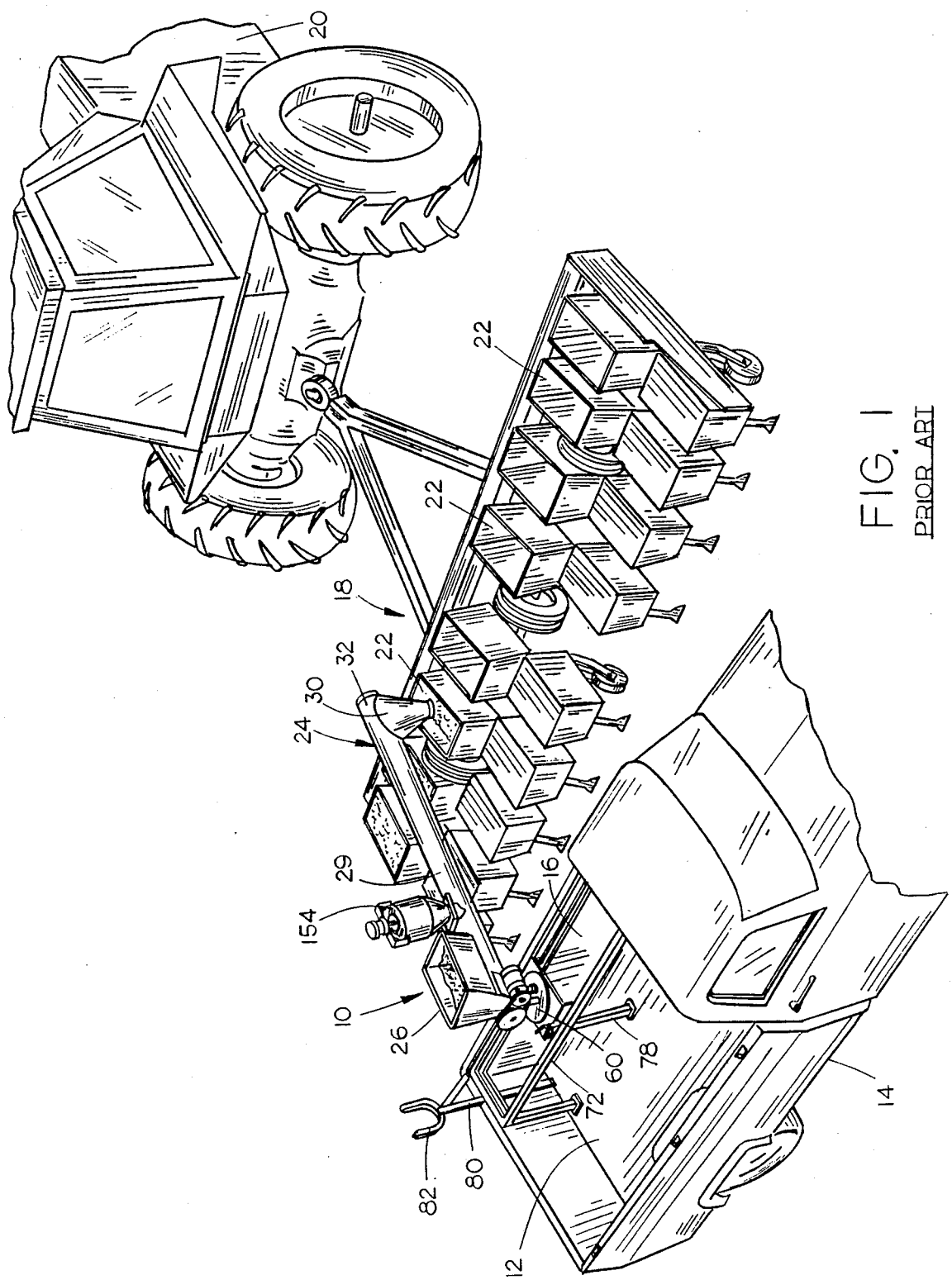
FIG. 1 is a perspective view of the sliding hopper unit of a prior invention installed on a pickup truck.

The seed treater and conveying apparatus of the '803 invention is referred to generally at 10 in FIG. 1 mounted on the bed 12 of pickup truck 14 adjacent side wall 16. The truck 14 is parked adjacent the rearward end of a planter implement 18 which is connected to tractor 20 and which includes several transversely spaced-apart seed hoppers 22. The seed treating and conveying apparatus includes an auger unit 24 having a hopper 26 mounted on the inlet end 28 of the auger which is supported for up and down pivotal movement, fore and aft pivotal movement and fore and aft sliding movement.

Figure 2:
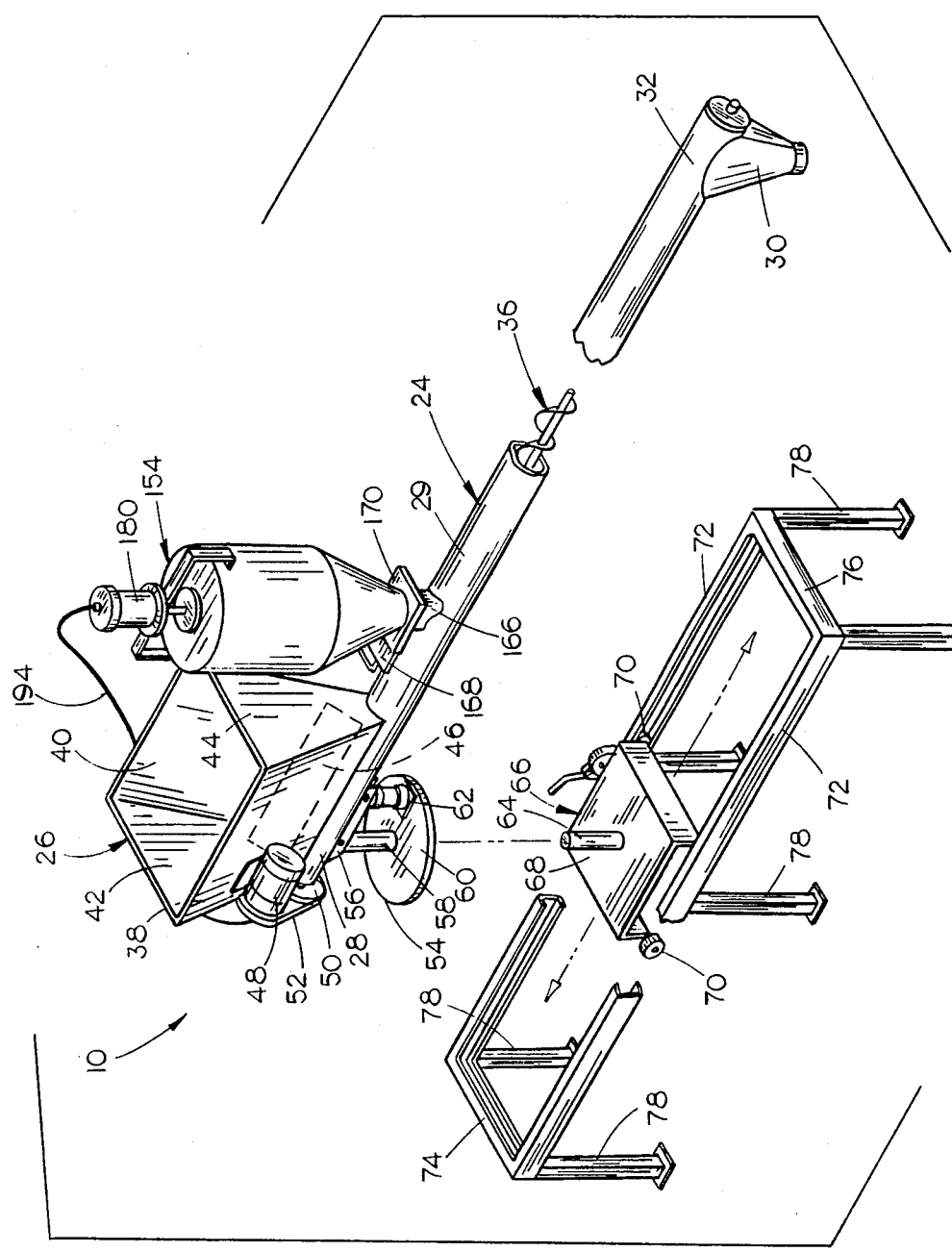
FIG. 2 is an exploded perspective view of the sliding hopper unit of the previous invention.

Referring to FIG. 2, auger unit 24 includes an elongated auger tube 29 having a spout 30 at discharge end 32, hopper 26 at inlet end 34 and an internal brush auger 36, described in further detail hereinbelow. Hopper 26 includes upwardly flaring sides 38 and 40, opposite ends 42 and 44 and an open bottom which is registered with an inlet opening (not shown) through the top of auger tube 29.

Hopper 26 is provided with an inclined baffle plate 46 which is connected to and extends between end walls 42 and 44 to prevent seed from being thrown back upwardly out of the hopper by the rotating auger. Baffle plate 46 is inclined with one side edge lower than the other and with both side edges spaced from hopper side walls 38 and 40 to provide seed passage downwardly into the auger tube. An electric motor 48 is mounted on hopper side wall 38 for connection to the auger drive wheel 50 by belt 52. Whereas a terminal or connector may be mounted on the truck for electrical connection to the lead wires for motor 48, another alternative is to simply extend elongated lead wires forwardly under the hood of the truck for connection to the terminals of the truck battery.

A pivotal support base 54 supports the inlet end 34 of auger unit 24. The auger tube has a pair of longitudinally extended depending flanges 56 which are pivotally connected to the upper end of a support sleeve 58 which is secured to the circular base plate 60.

A hydraulic jack 62 is supported on plate 60 and also is pivotally connected to flanges 56 as the power source for pivotally raising and lowering the discharge end of auger unit 24.

Figure 6:
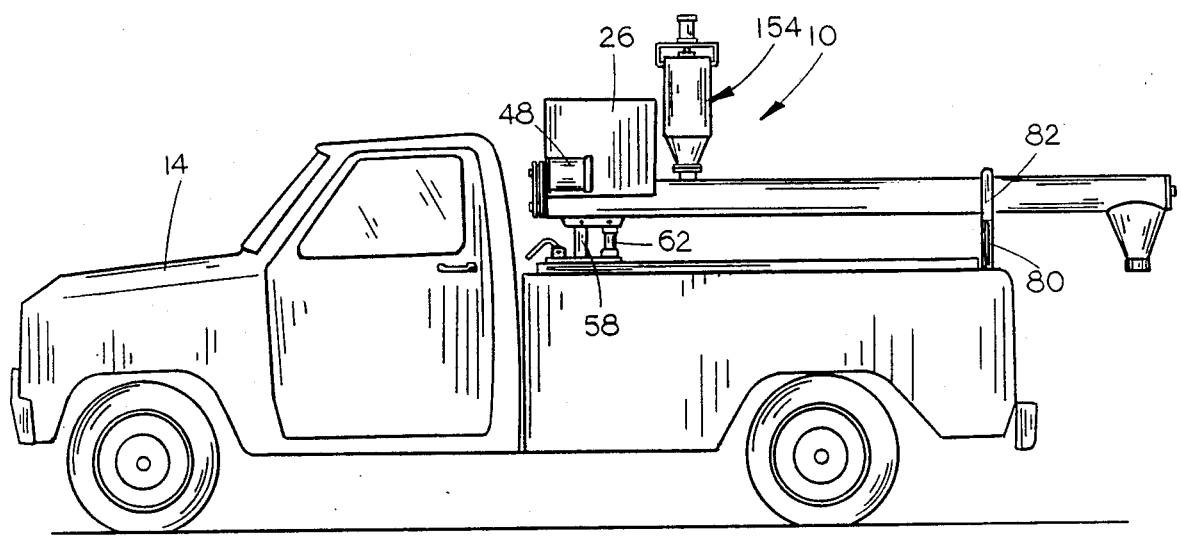
FIG. 6 is a side elevational view of the sliding hopper unit of the previous invention in its transport position on a pickup truck.

Support sleeve 58 is telescopically received onto upright post 64 which is centrally situated on slidable support base 66 having a flat top surface 68 for engaging circular plate 60. A ball bearing wheel 70 is rotatably supported at each corner of slidable support base 66 for rolling movement along the lower flanges of a pair of channel-shaped slide tracks 72. The slide tracks are interconnected by cross members 74 and 76 and are supported in spaced relation above a support surface by six legs 78. In FIG. 1, it can be seen that the slide tracks 72 are of a length to fit snugly within the bed of a pickup truck with the tailgate closed. The three outer legs 78 are so spaced and positioned as to fit within the stake holes in truck sidewalls 16. An upstanding post 80 at the rearward end of the slide tracks carries an open-topped channel bracket 82 for supporting auger unit 24 in its transport position as illustrated in Figure 6. In the transport position, the slidable support base 66 is moved to its forwardmost position and secured therein by a cammed friction latch 84. A similar latch may be provided for releasably fixing the rotational position of circular plate 60 on support base 66.

Figure 3:
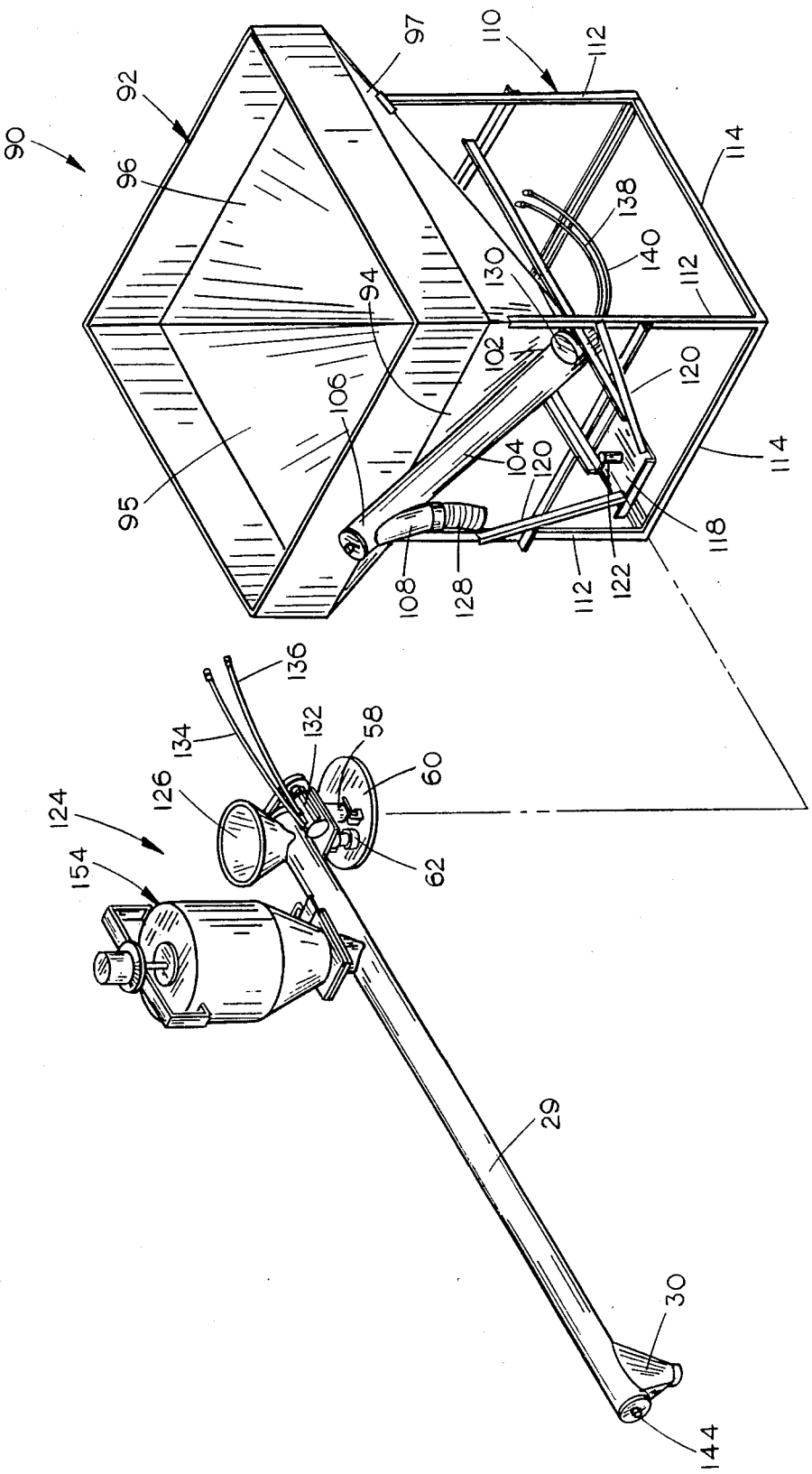
FIG. 3 is a partially exploded perspective view of the large stationary hopper unit of the previous invention.
Figure 7:
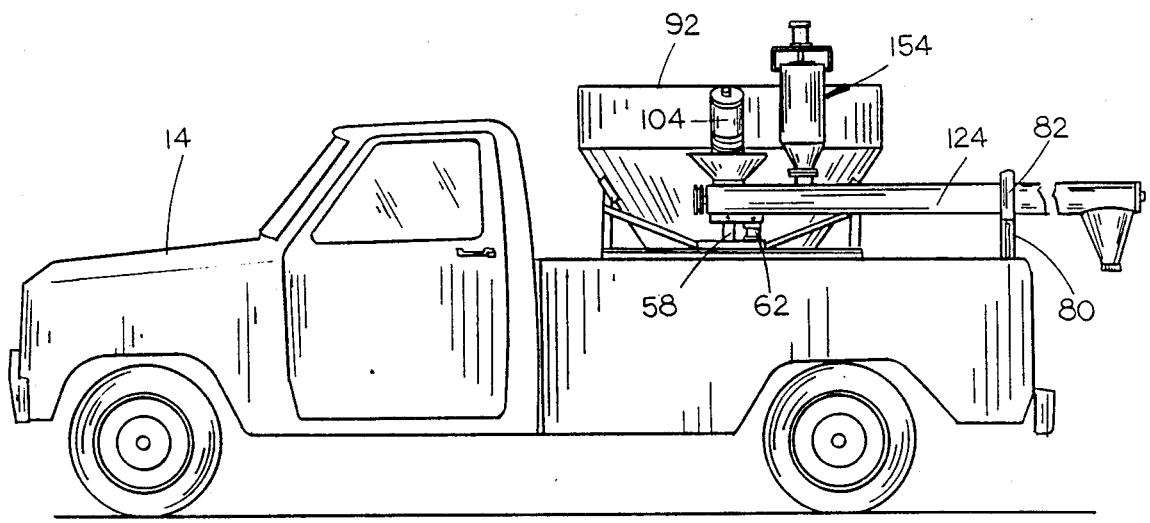
FIG. 7 is a side elevational view of the large stationary hopper unit of the previous invention in its transport position on a pickup truck.
Figure 11:
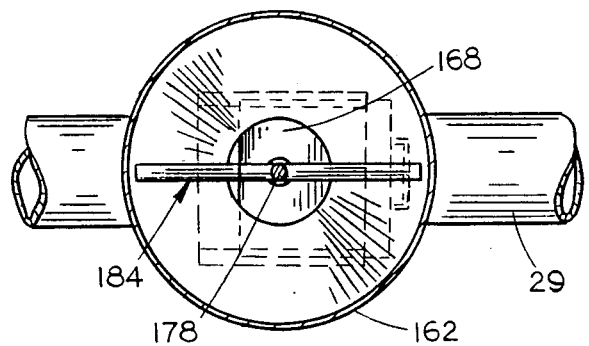
FIG. 11 is a top sectional view of the treatment applicator tank taken along line 11—11 in FIG. 12.

Another embodiment of applicant's seed treating and conveying apparatus 90 is shown in FIGS. 3, 4, and 5. A large hopper 92 includes four downwardly tapering side walls 94, 95, 95 and 97 which converge toward an inclined bottom plate 98 which slopes downwardly toward side wall 94 for conveying grain through an outlet opening 100 for passage of grain into the lower inlet end 102 of an inner auger unit 104 having an upper discharge end 106 in communication with spout 108. The inner auger unit 104 and hopper 92 are stationarily supported on a frame 110. As shown in FIGS. 5 and 7, the frame 110 is preferably of a size for placement on the bed 12 of truck 14 between the wheel wells 13. The upstanding corner legs 112 of frame 110 are connected at their lower ends by bottom braces 114 which may be removably bolted to the truck bed if desired. Frame 110 includes an outward lateral projection 116 which is adapted to overlie one side wall of truck bed 12 as seen in FIG. 5. Projection 116 includes a generally horizontal support plate 118 which is secured by braces 120 for supporting an upright center post 122.

The auger unit 124 is similar to the previously described auger unit 24. Accordingly, like reference numerals are used to designate like parts of each. The inlet end 28 of auger tube 29 is pivotally mounted on support sleeve 58 with hydraulic jack 62 being provided for raising and lowering the outer discharge end 32 of the auger. The inlet hopper 126 is a funnel-shaped member mounted on the auger tube in registration with an inlet opening therethrough. Grain is conveyed from the discharge end 108 of inner auger 104 into the hopper 126 of auger unit 124 through a flexible tube 128 which serves to prevent splattering and throwback to the seeds. Sleeve 58 is of course adapted to be received onto post 122 to enable fore and aft pivotal movement of the outer end 32 of auger unit 124.

Auger unit 124 is thus removably positioned on frame 110 by means of the post 122 and sleeve 58 connection. This is an important feature as it enables the outer auger unit to be removed and repositioned for loading seed into the hopper 92. The seed is therefore gently handled by the bristle flighting of brush auger 36 during both the loading and unloading of hopper 92.

Inner auger unit 104 is driven by a hydraulic motor 130 and outer auger unit 124 is driven by hydraulic motor 132 through appropriate drive pulleys and belts as shown. The hydraulic lines 134 and 136 for motor 132 and hydraulic lines 138 and 140 of hydraulic motor 132 are connected by appropriate quick disconnect fittings to a hydraulic junction box 142 mounted on the rearward end of planter implement 18, as shown in FIG. 5.

FIG. 7 shows the transport position for auger unit 124. The auger unit is pivoted rearwardly and placed in a resting position within the channel bracket 82 on the support post 80.

The brush auger 36 for auger unit 124 is shown in FIG. 8. The brush augers within inner auger unit 104 and the auger unit 24 of the sliding auger embodiment of FIGS. 1 and 2 are similarly constructed. Brush auger 36 includes an elongated center shaft 144 with brush flighting 146 extending outwardly from the center shaft as shown. The brush flighting comprises a plurality of bristles 148 crimped within an elongated generally U-shaped channel member 150 having a web 152 secured to center shaft 144 in a generally spiral path about the center shaft. Bristles 148 are thus spaced from the center shaft only by the thickness of the web 152 and the radial extent of channel 150 from the center shaft is only a small fraction of the radial extent of the bristles 148.

Whereas the specific dimensions and arrangement of the brush flighting may be varied, it is desirable that the bristles 148 be stiff enough to achieve a sufficient flow capacity yet resilient enough to prevent crushing of the seeds. One example of an acceptable auger design uses polypropylene or nylon filaments having a diameter of 0.014 inches. The bristles are secured to a one inch diameter center shaft 144 along a spiral with a four inch pitch. The outside diameter of the bristle flighting is four and seven-eighths inches for fitting within a five inch inside diameter auger tube. Other augers could have ' center shaft diameters of one and one-quarter inch or one and one-half inch, for example, or a tube diameter of six inches. The resulting auger units should be capable of conveying approximately six bushels of seed per minute or about 60 pounds of seed in ten seconds. Hydraulically powered augers will likely have a variable speed capability, but this feature may not be available on electrically powered augers.

Finally, an important feature of the present invention is the chemical treatment applicator 154 for depositing chemicals, preferably in the form of a powder, on the seeds conveyed through the auger tube. Applicator 154 includes an upright tank 156 having a discharge end 158 at the lower end thereof. The auger tube of each of the auger units 24 and 124 include an applicator opening 160 situated in the top of auger tube 29 between the inlet end 34 and discharge end 32 thereof. The applicator is preferably mounted closer to the inlet end of the auger unit to minimize the leverage effect of the applicator's weight on the raising and lowering of the auger unit.

Applicator tank 156 comprises a generally cylindrical upper wall portion 162 which merges with an intermediate generally conical wall portion 164 which tapers downwardly toward the cylindrical lower wall portion 166 at the discharge end 158. A slide gate 168 is mounted at the junction between the intermediate and lower wall portions for adjustable sliding movement within a frame 170 whereby the slide gate 168 can be moved for selectively and adjustably closing and opening discharge opening 158.

A baffle 172 is supported on a shaft 174 extended diametrically across cylindrical lower wall portion 166, generally paralleled to the longitudinal axis of auger tube 29. The generally circular baffle plate 172 is disposed at approximately a 45° angle so that clearance spaces are provided on opposite sides of the baffle plate for passage of treatment material into the auger tube. The inclination of the baffle however directs the greater portion of the dispensed treatment downwardly along one side wall of the auger tube 29 where it is picked up by the brush flighting 146 for application to the seed.

Figure 12:
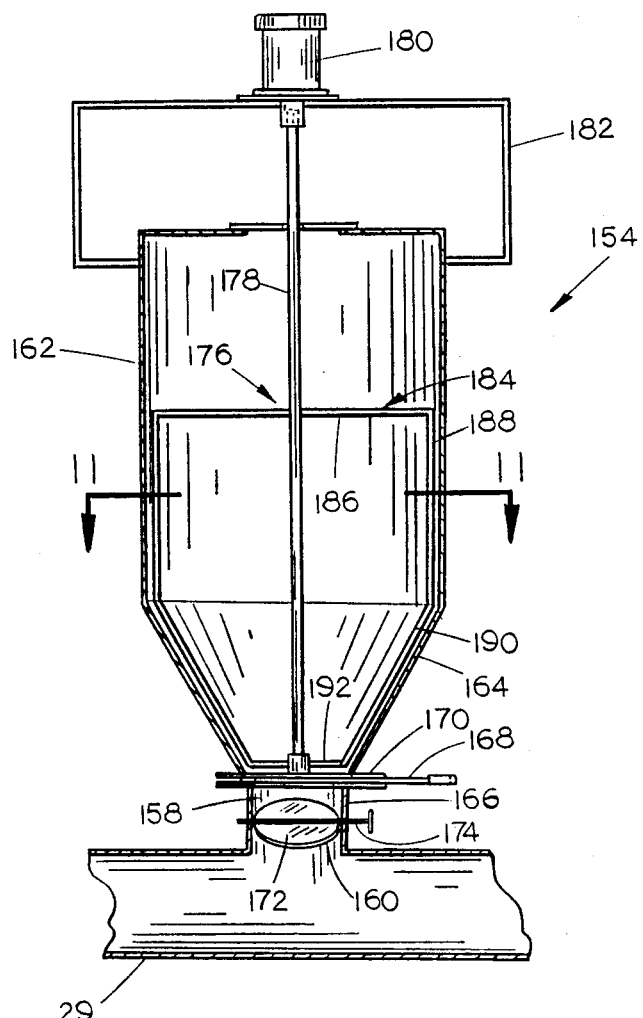
FIG. 12 is a side sectional view of the treatment applicator tank.

An agitator 176 is provided within the applicator tank 156 due to the thickness and adhesive nature of many chemical treatments. Whereas tank agitators may be of various designs, a preferred design for the applicator tank 156 includes an upright center shaft 178 extending through tank 156 as shown in FIG. 12. Center shaft 178 carries a pair of peripheral sweep arms 184 having a shape generally conforming to the inner periphery of the tank to agitate any material collecting along the interior walls. Each arm includes a radially outwardly directed top member 188 which bends into an inwardly inclined lower portion which finally bends into the short generally horizontal bottom member 192. Top and bottom members 186 and 192 are rigidly secured to the center shaft 178 for rotation therewith.

In the apparatus 10 of FIGS. 1 and 2, a drive cable 194 extends from the electric motor 48 to the gear reduction unit 180 for rotating the agitator shaft 178 in response to operation of the auger but at a lower rotational velocity. For the hydraulic actuated auger units of apparatus 90 shown in FIGS. 4 and 5, a similar drive cable 196 may connect the gear reduction unit 180 to one end of hydraulic motor 132 as shown in FIG. 5. Alternatively, an electric motor or separate hydraulic motor may be provided on the applicator tank for rotating the center shaft 178 thereof.

Figure 13:
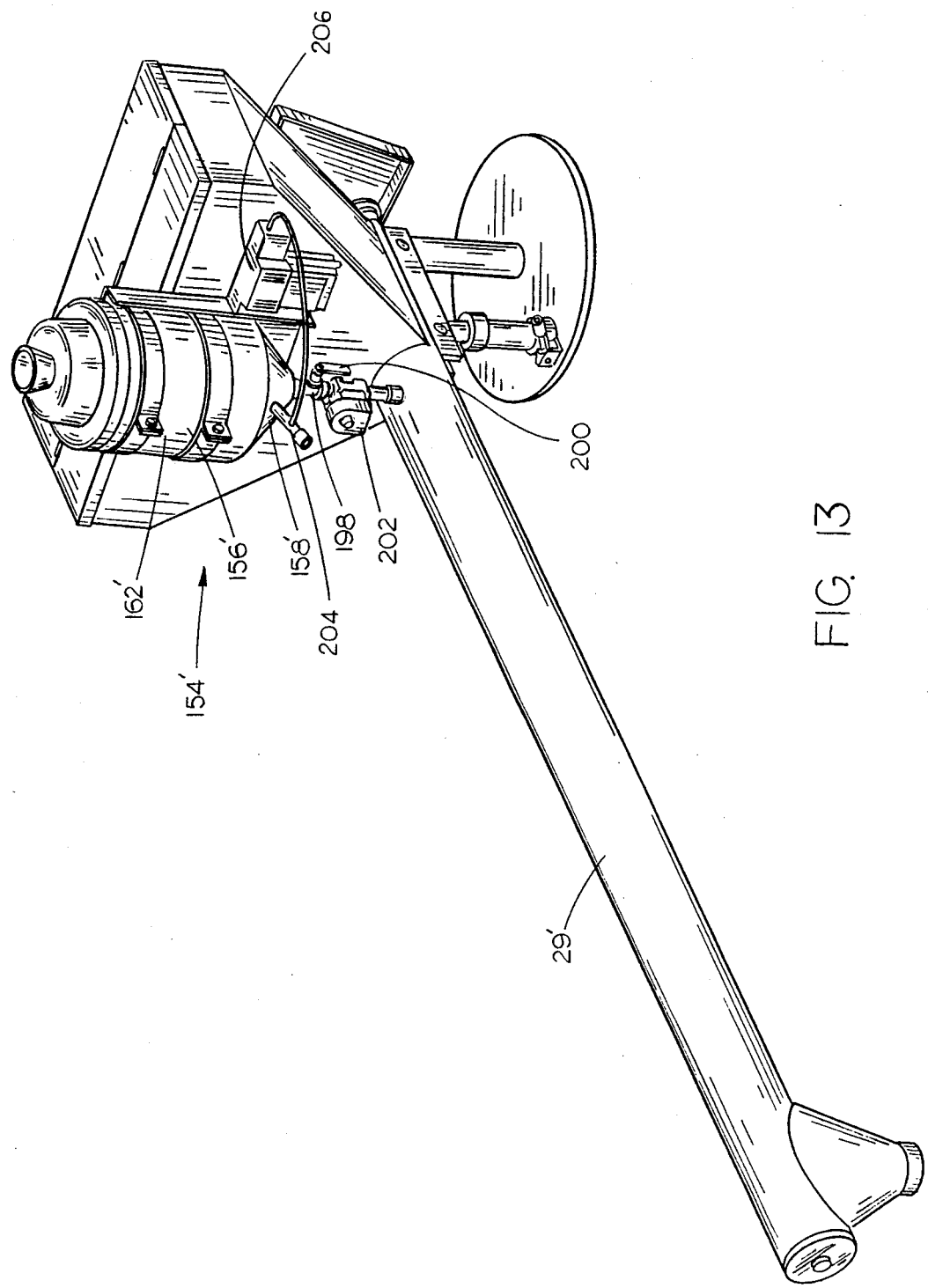
FIG. 13 is an enlarged perspective view of a modified form of the invention.

Referring now to FIG. 13, the chemical treatment applicator of the present invention is designated generally at 154', and is designed to deposit liquid chemicals on the seeds conveyed through the auger tube 29'. Applicator 154', includes an upright tank 156' having a discharge end 158' at the lower end thereof. A manually operated valve 198 is interposed between discharge end 158', of upright tank 156' and auger tube 29'. A valve control handle 200 is selectively pivotable to selectively and adjustably open or close manual valve 198 in a conventional fashion. A solenoid valve 202 is interposed between manual valve 198 and auger tube 29', and is operable between an open and closed position to allow or disallow the flow of chemical from upright tank 156' to auger tube 29, Applicator tank 156' comprises a generally cylindrical upper wall portion 162' which merges with a generally conical shaped discharge end 158' to its connection with manual valve 198. Handle 200 on valve 198 is selectively pivotable to a variety of positions between fully off and fully on, such that valve 198 may be selectively adjusted to various flow rates of chemical from tank 156'. Solenoid valve 202 is electrically connected to the auger motor 48 (not shown in FIG. 13), such that valve 202 will open when electric motor 48 is activated, and will close when electric motor 48 is deactivated. In this fashion, the applicator 154' will automatically supply liquid chemical treatments in an appropriate, adjustable amount to seeds being carried in the auger tube.

An air pump 204 is mounted on discharge end 158' of upright tank 156, and communicates with the interior thereof to agitate the liquid chemicals therein. Air pump 204 is driven by a small motor 206 mounted on the applicator housing.

Whereas the invention has been shown and described in connection with the preferred embodiments thereof, it is apparent that many modifications, substitutions and additions may be made which are within the intended broad scope of the appended claims. For example, whereas the preferred form of the invention has been designed for treating and conveying seed, other embodiments may be adapted and designed for treating and conveying other grains, pellets or granular materials.

Thus there has been shown and described a seed treater and conveying apparatus which accomplishes at least all of the above stated objects.

I claim:

1. An apparatus for simultaneously conveying seed and applying a liquid chemical treatment to it, comprising, in combination, an elongated auger tube having opposite inlet and discharge ends, seed supply means adjacent the inlet end thereof, an applicator opening through said tube at a position spaced downstream from said seed supply means and an auger rotatably supported therein, said auger comprising an elongated center shaft and brush flighting extending outwardly from said center shaft, an applicator for depositing liquid chemical treatment on the seed conveyed through the auger tube, said applicator comprising, an upright tank having a discharge opening at the lower end thereof, means for supporting said tank relative to said auger tube such that said discharge opening is in communication with said applicator opening, a first valve means between said discharge opening of said upright tank and said auger tube for regulating the flow of liquid chemical into said auger tube, a second electrically controlled valve means between said discharge opening of said upright tank and said auger tube which is normally closed but which is opened upon the actuation of said auger, selectively actuatable motor means operably connected to said auger for rotating said auger;

said second valve means being electrically connected to said motor means so as to open upon actuation of said motor and so as to close upon deactivation of said motor.

2. The combination of claim 1 wherein an air agitator means is in communication with the interior of said upright tank for agitating the liquid chemical therein.

* * * * *